US012327517B2

(12) United States Patent
Zheng et al.

(10) Patent No.: US 12,327,517 B2
(45) Date of Patent: Jun. 10, 2025

(54) DISPLAY PANEL AND DISPLAY DEVICE

(71) Applicant: Tianma Advanced Display Technology Institute (Xiamen) Co., Ltd., Fujian (CN)

(72) Inventors: Minhui Zheng, Fujian (CN); Yingteng Zhai, Fujian (CN); Xueling Li, Fujian (CN)

(73) Assignee: Tianma Advanced Display Technology Institute (Xiamen) Co., Ltd., Fujian (CN)

( * ) Notice: Subject to any disclaimer, the term of this patent is extended or adjusted under 35 U.S.C. 154(b) by 0 days.

(21) Appl. No.: 18/593,068

(22) Filed: Mar. 1, 2024

(65) Prior Publication Data

US 2024/0203331 A1 Jun. 20, 2024

(30) Foreign Application Priority Data

Nov. 24, 2023 (CN) ......................... 202311579369.8

(51) Int. Cl.
*G09G 3/32* (2016.01)

(52) U.S. Cl.
CPC ...................................... *G09G 3/32* (2013.01)

(58) Field of Classification Search
CPC ......... G06F 3/017; G06F 3/011; G06F 3/0304
See application file for complete search history.

(56) References Cited

U.S. PATENT DOCUMENTS

2018/0033365 A1* 2/2018 Zhang .................. G09G 3/3233
2018/0218680 A1* 8/2018 Cai ...................... G09G 3/3275
2022/0319418 A1* 10/2022 Yu ........................ G09G 3/3233
2024/0334078 A1* 10/2024 Melamud ............... H04N 25/78

* cited by examiner

*Primary Examiner* — Van N Chow
(74) *Attorney, Agent, or Firm* — CHRISTENSEN O'CONNOR JOHNSON KINDNESS PLLC

(57) ABSTRACT

A display panel and a display device are provided. The display panel includes a light-emitting element, a pixel circuit, and a comparison module. The pixel circuit includes a driving transistor and a first transistor, and the first transistor and the driving transistor are connected to each other in series. The comparison module is coupled to a gate of the first transistor, and the comparison module is configured to compare a voltage value of a comparison signal and a voltage value of the reference signal to generate a control signal, and to provide the control signal to the gate of the first transistor. An operating phase of the pixel circuit includes a light-emitting phase. During the light-emitting phase, the comparison signal is a constant voltage signal, and a voltage of the reference signal changes over time in at least one period.

19 Claims, 8 Drawing Sheets

DISPLAY PANEL AND DISPLAY DEVICE

CROSS-REFERENCE TO RELATED APPLICATIONS

The present application claims priority to Chinese Patent Application No. 202311579369.8, filed on Nov. 24, 2023, the content of which is incorporated herein by reference in its entirety.

TECHNICAL FIELD

The present disclosure relates to the field of display technologies, and, particularly, relates to a display panel and a display device.

BACKGROUND

Micro light-emitting diodes (Micro-LEDs) are widely used in the display field due to their many advantages such as high brightness, low power consumption, fast response, small size, and long service life. Micro-LEDs are usually only tens to hundreds of microns in size, and each Micro-LED is a separate light-emitting unit, which can achieve very high pixel density. However, the pixel circuits in the related art still can be improved in terms of the control of the light-emitting duration of Micro-LED.

SUMMARY

In a first aspect, embodiments of the present disclosure provide a display panel. The display panel includes at least one light-emitting element, at least one pixel circuit coupled to the at least one light-emitting element, and at least one comparison module. One pixel circuit of the at least one pixel circuit includes a driving transistor and a first transistor that are connected to each other in series. One of the at least one comparison module is coupled to a gate of the first transistor and is configured to compare a voltage value of a comparison signal and a voltage value of a reference signal to generate a control signal, and to provide the control signal to the gate of the first transistor. An operating phase of one pixel circuit of the at least one pixel circuit includes a light-emitting phase. During the light-emitting phase, the comparison signal is a constant voltage signal during the light-emitting phase, and a voltage of the reference signal changes over time during at least one period of the light-emitting phase.

In a second aspect, embodiments of the present disclosure provide a display device including a display panel. The display panel includes at least one light-emitting element, at least one pixel circuit coupled to the at least one light-emitting element, and at least one comparison module. One pixel circuit of the at least one pixel circuit includes a driving transistor and a first transistor that are connected to each other in series. One of the at least one comparison module is coupled to a gate of the first transistor and is configured to compare a voltage value of a comparison signal and a voltage value of a reference signal to generate a control signal, and to provide the control signal to the gate of the first transistor. An operating phase of one pixel circuit of the at least one pixel circuit includes a light-emitting phase. During the light-emitting phase, the comparison signal is a constant voltage signal during the light-emitting phase, and a voltage of the reference signal changes over time during at least one period of the light-emitting phase.

BRIEF DESCRIPTION OF DRAWINGS

In order to more clearly explain the embodiments of the present disclosure or the technical solution in the related art, the drawings to be used in the description of the embodiments or the related art will be briefly described below. The drawings in the following description are some embodiments of the present disclosure. For those skilled in the art, other drawings may further be obtained based on these drawings.

DESCRIPTION OF EMBODIMENTS

In order to better understand technical solutions of the present disclosure, the embodiments of the present disclosure are described in detail with reference to the drawings. It should be clear that the described embodiments are merely part of the embodiments of the present disclosure rather than all of the embodiments. Based on the embodiments of present disclosure, all other embodiments obtained by those skilled in the art shall fall within the scope of the present disclosure.

Terms used in the embodiments of the present disclosure are only for the purpose of describing specific embodiments and are not intended to limit the present disclosure. Unless otherwise specified in the context, words, such as "a", "the", and "this", in a singular form in the embodiments of the present disclosure and the appended claims include plural forms.

It should be understood that although the terms first and second may be used to describe XX in the embodiments of the present disclosure, these XX should not be limited to these terms. These terms are only used to distinguish XXs from each other. For example, without departing from the scope of the embodiments of the present disclosure, the first XX may also be referred to as the second XX, and similarly, the second XX may also be referred to as the first XX.

LED light-emitting elements of different colors include different luminescent materials and have different luminous efficiencies, and the luminous efficiencies light-emitting elements of different colors are affected by temperature in different degrees. For example, the temperature increase caused by a long-time use of a display product, or insufficient brightness of the light-emitting element causes by a decreasing luminous efficiency when it is used at a relatively high temperature, will result in a display color cast. In the related art, light-emitting elements of different colors are driven by the same pixel circuits, and the light-emitting duration of the light-emitting elements cannot be adjusted individually, and the light-emitting duration will affect the brightness of the light-emitting element. The related art cannot adjust the light-emitting duration to compensate the brightness of the light-emitting element.

In order to solve the problems in the related art, embodiments of the present disclosure provide a display panel where a comparison module is connected to a gate of a first transistor and a turn-on duration of the first transistor is controlled by comparing a voltage of a comparison signal and a voltage of a reference signal, thereby controlling the light-emitting duration of the light-emitting element. In this way, the adjustment of the light-emitting duration of the light-emitting element is realized, which can meet the requirements for the light-emitting duration in different application scenarios.

Figure 1:
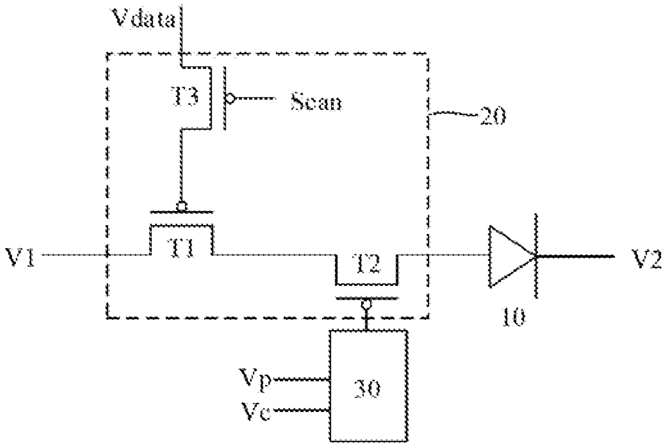
FIG. 1 is a circuit diagram of a display panel provided by some embodiments of the present disclosure.

FIG. 1 is a circuit diagram of a display panel provided by some embodiments of the present disclosure. As shown in FIG. 1, the display panel includes a light-emitting element 10 and a pixel circuit 20. The pixel circuit 20 includes a driving transistor T1 and a first transistor T2. The first transistor T2 and drive transistor T1 are connected to each other in series. FIG. 1 illustrates that the first transistor T2 is connected between the driving transistor T1 and the light-emitting element 10. FIG. 1 illustrates that a source of the driving transistor T1 receives a first power supply voltage V1, a drain of the driving transistor T1 is connected to the first transistor T2, and a first electrode of the light-emitting element 10 is coupled to the first transistor T2, and a second electrode of the light-emitting element 10 receives a second power voltage V2. In some embodiments, the first power supply voltage V1 is a positive power supply voltage, and the second power supply voltage V2 is a negative power supply voltage. The light-emitting element 10 is an inorganic light-emitting diode, such as a Micro-LED and a Mini-LED. Since the first transistor T2 and the driving transistor T1 are connected to each other in series, a turn-on duration of the first transistor T2 affects a conduction duration of the pixel circuit 20 and a conduction duration of the light-emitting element 10, thus affecting the light-emitting duration of the light-emitting element 10.

The pixel circuit 20 in FIG. 1 is only simplified. The pixel circuit 20 includes a data writing transistor T3. The data writing transistor T3 includes a gate configured to receive a scanning signal Scan, a source configured to receive a data signal Vdata, and a drain coupled to a gate of the driving transistor T1. Each transistor in the pixel circuit 20 is illustrated as a p-type transistor. In other embodiments, each transistor in the pixel circuit 20 is an n-type transistor.

As shown in FIG. 1, the display panel further includes a comparison module 30. The comparison module 30 is coupled to a gate of the first transistor T2. The comparison module 30 is configured to compare a voltage value of a comparison signal Vp and a voltage value of a reference signal Vc to generate a control signal, and to provide the control signal to the gate of the first transistor T2. That is, an on/off state of the first transistor T2 is controlled by the control signal. For example, when Vp-Vc is smaller than a threshold, the comparison module 30 can provide an effective level signal to the gate of the first transistor T2, and the effective level signal controls the first transistor T2 to turn on. When Vp-Vc is greater than the threshold, the comparison module 30 can provide an ineffective level signal to the gate of the first transistor T2, and the ineffective level signal controls the first transistor T2 to turn off. In other embodiments, when Vp-Vc is greater than the threshold, the comparison module 30 can provide an effective level signal, and when Vp-Vc is smaller than the threshold, the comparison module 30 can provide an ineffective level signal. The threshold may be 0 V, or may be a positive value or a negative value. The threshold may be set according to the structure of the comparison module 30.

In the display panel, the pixel circuits 20 are arranged to form multiple pixel circuit rows, and the multiple pixel circuit rows are driven row by row to display images. Each pixel circuit 20 operates once when displaying a frame image, so the operating phase of the pixel circuit 20 is the refreshing duration of one frame image, and all pixel circuit rows are driven row by row once during the refreshing duration of one frame image. The operating phase of the pixel circuit 20 includes a light-emitting phase. During the light-emitting phase, the driving transistor T1 can be turned on. When the first transistor T2 is further turned on, a voltage difference is formed between the first electrode and the second electrode of the light-emitting element 10 to control the light-emitting element 10 to emit light.

Figure 2:
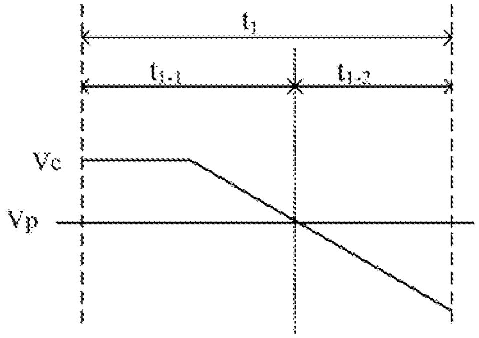
FIG. 2 is a sequence diagram of a light-emitting phase provided by some embodiments of the present disclosure.

FIG. 2 is a sequence diagram of a light-emitting phase provided by some embodiments of the present disclosure. As shown in FIG. 2, during the light-emitting phase t1, the comparison signal Vp is a constant voltage signal, and a voltage of the reference signal Vc changes over time during at least one period. During a period t1-1 of the light-emitting phase t1, the voltage value of the comparison signal Vp is smaller than the voltage value of the reference signal Vc, and during another period $t_{1-2}$, the voltage value of the comparison signal Vp is greater than the voltage value of the reference signal Vc.

For example, when Vp-Vc is smaller than the threshold, the control signal output by the comparison module 30 controls the first transistor T2 to turn on. When Vp-Vc is greater than the threshold, the control signal output by the comparison module 30 controls the first transistor T2 to turn off.

During the period t1-1, Vp-Vc is smaller than the threshold, the comparison module 30 provides an effective level signal to the gate of the first transistor T2, the first transistor T2 is turned on so that the driving transistor T1 and the light-emitting element 10 are turned on, and the light-emitting element 10 emits light. During the period $t_{1-2}$, Vp-Vc is greater than the threshold, the comparison module 30 provides an ineffective level signal to the gate of the first transistor T2, the first transistor T2 is turned off, and the light-emitting element 10 does not emit light at this time. The period $t_{1-1}$ is a period during which the light-emitting element 10 emits light, and the period $t_{1-2}$ is a period during which the light-emitting element 10 does not emit light. The period $t_{1-1}$ determines the light-emitting duration of the light-emitting element 10. For example, when a waveform of the reference signal Vc remains unchanged, the light-emitting duration of the light-emitting element 10 can be adjusted by changing the voltage of the comparison signal Vp.

To explain the principle of the present disclosure, the timing sequence shown in FIG. 2 illustrates that the moment Vp=Vc is used to define the light-emitting period and the non-light-emitting period in the light-emitting phase $t_1$, that is, it is equivalent that the threshold is 0 V. In some embodiments, the threshold value may be greater than 0 V or smaller than 0 V.

In the display panel provided by the embodiments of the present disclosure, the comparison module 30 is connected to the gate of the first transistor T2 and controls the turn-on duration of the first transistor T2 by comparing the voltage of the comparison signal Vp and the voltage of the reference signal Vc so as to control the light-emitting duration of the light-emitting element 10. The comparison module 30 is used to adjust the light-emitting duration of the light-emitting element 10, and the light-emitting elements 10 of different colors can have different light-emitting durations by designing the comparison signals Vp and/or the reference signals Vc corresponding to the light-emitting elements 10 of different colors, which can flexibly adjust the light-emitting durations of the light-emitting elements 10 of different colors to meet the application requirements of multiple scenarios. In some application scenarios, such as when being used in a high-temperature environment or being used for a long time, the brightness of the light-emitting element 10 can be compensated by adjusting the light-emitting duration, thereby improving the display color cast.

Figure 3:
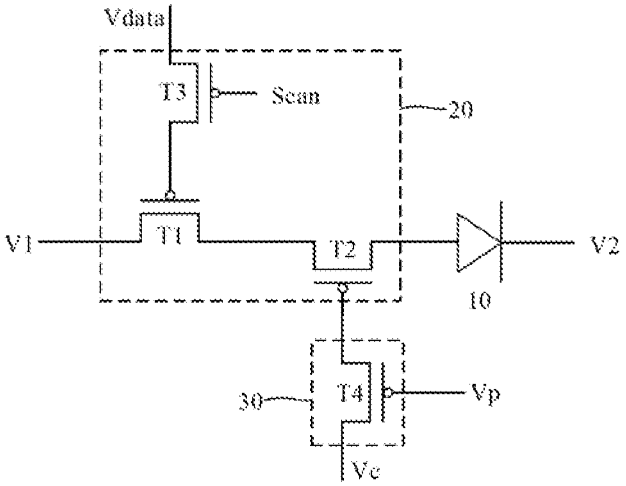
FIG. 3 is another circuit diagram of a display panel provided by some embodiments of the present disclosure.

In some embodiments, the comparison module 30 is a voltage comparator, which can have any structure in the related art that can realize the voltage comparison function and is not shown in the figures. FIG. 3 is another circuit diagram of a display panel provided by some embodiments of the present disclosure. In other embodiments, as shown in FIG. 3, the comparison module 30 includes a comparison transistor T4, and one of a gate and a source of the comparison transistor T4 is configured to receive the comparison signal Vp, and the other one of the gate and the source of the comparison transistor T4 is configured to receive the reference signal Vc. The comparison transistor T4 can determine an operating state of the comparison transistor T4 by comparing a voltage difference between the gate and the source of the comparison transistor T4. When the comparison transistor T4 is turned on, the drain of the comparison transistor T4 outputs a control signal to the gate of the first transistor T2, thereby controlling the turn-on duration of the first transistor T2. The comparison transistor T4 has a simple structure, which enables the comparison module 30 to occupy a smaller space in the display panel and has small impact on other circuit wiring in the display panel. The comparison transistor T4 can be manufactured using a same process as the transistors in the pixel circuit 20 without adding additional processes. In some embodiments, as shown in FIG. 3, the comparison transistor T4 is a p-type transistor, the gate of the comparison transistor T4 is configured to receive the comparison signal Vp, and the source of the comparison transistor T4 is configured to receive the reference signal Vc. A threshold voltage of the comparison transistor T4 is Vth. When Vp-Vc<Vth, the comparison transistor T4 is turned on, and the drain of the comparison transistor T4 provides a voltage to the gate of the first transistor T2; and when the turn-on condition of the first transistor T2 is satisfied, the first transistor T2 is turned on so that the driving transistor T1 and the light-emitting element 10 are turned on. It can be understood that in order to satisfy the turn-on condition of the first transistor T2, Vp-Vc<threshold is satisfied, however, in practice, the threshold may not be equal to Vth and is related to the characteristics of the first transistor T2. However, the turning on of the first transistor T2 is at least based on the turning on of the comparison transistor T4, that is, the turn-on duration of the first transistor T2 can be controlled by controlling the turn-on duration of the comparison transistor T4, thereby controlling the light-emitting duration of the light-emitting element 10.

In other embodiments, the comparison transistor T4 is an n-type transistor, which is not shown in the figures. For example, the gate of the comparison transistor T4 is configured to receive the comparison signal Vp, and the source of the comparison transistor T4 is configured to receive the reference signal Vc. A threshold voltage of the comparison transistor T4 is Vth, when Vp-Vc>Vth, the comparison transistor T4 turns on to provide a voltage to the gate of the first transistor T2. When the turn-on condition of the first transistor T2 is satisfied, the first transistor T2 turns on so that the driving transistor T1 and the light-emitting element 10 are turned on. In this way, the turn-on duration of the first transistor T2 can be controlled, thereby controlling the light-emitting duration of the light-emitting element 10.

Figure 4:
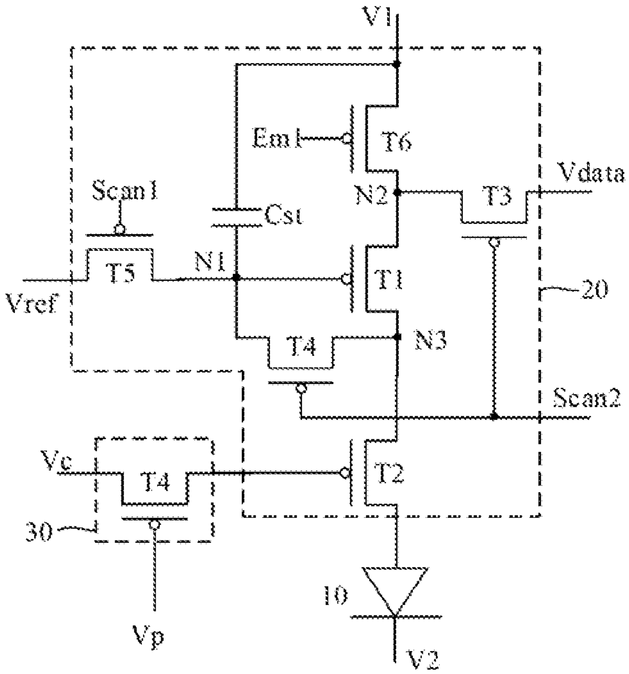
FIG. 4 is another circuit diagram of a display panel provided by some embodiments of the present disclosure.

FIG. 4 is another circuit diagram of a display panel provided by some embodiments of the present disclosure. In some embodiments, as shown in FIG. 4, the driving transistor T1 is connected in series between the first transistor T2 and the first control transistor T6. The first control transistor T6 includes an electrode configured to receive a first power supply voltage V1, and a gate configured to receive the first control signal Em1. A gate reset transistor T5 included a first electrode configured to receive a reset signal Vref, a second electrode connected to a first node N1, and a gate configured to receive a first scan signal Scan1. A data writing transistor T3 is connected to a second node N2, and a threshold compensation transistor T4 is connected in series between the first node N1 and a third node N3. A gate of the data writing transistor T3 and a gate of the threshold compensation transistor T4 receive a second scan signal Scan2. The pixel circuit 20 further includes a storage capacitor Cst, one plate of the storage capacitor Cst is configured to receive the first power supply voltage V1, and the other plate of the storage capacitor Cst is connected to the first node N1. During the light-emitting phase, when the first control transistor T6 is turned on, the driving transistor T1 is turned on, and when the first transistor T2 is turned on, the pixel circuit 20 provides a voltage to a first electrode of the light-emitting element 10 and the light-emitting element 10 emits light. A turn-on duration of the first control transistor T6 is controlled by the first control signal Em1. In the embodiments, during the operating phase of the pixel circuit 20, the turn-on duration of the first control transistor T6 is greater than or equal to the turn-on duration of the first transistor T2. In other words, during the operating phase of the pixel circuit 20, a pulse width of the effective level of the first control signal Em1 is greater than or equal to a pulse width of the effective level provided by the comparison module 30. In some embodiments, an initial turn-on moment of the first control transistor T6 is earlier than an initial turn-on moment of the first transistor T2 in the operating phase of the pixel circuit 20.

Figure 5:
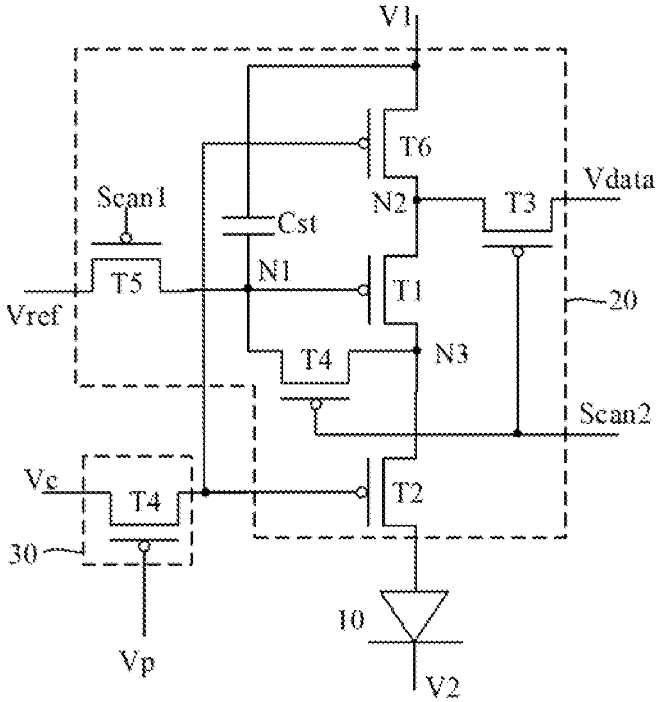
FIG. 5 is another circuit diagram of a display panel provided by some embodiments of the present disclosure.

FIG. 5 is another circuit diagram of a display panel provided by some embodiments of the present disclosure. In other embodiments, as shown in FIG. 5, the gate of the first control transistor T6 is connected to the comparison module 30, that is, the comparison module 30 controls the first transistor T2 and the first control transistor T6 simultaneously.

Figure 6:
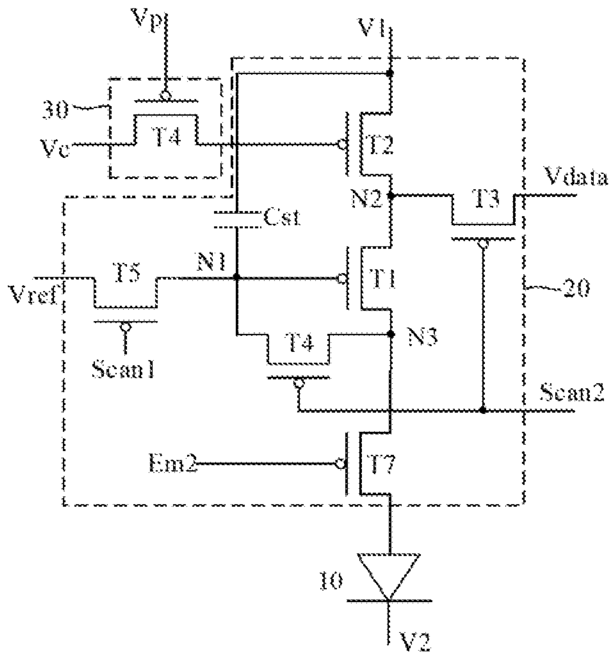
FIG. 6 is another circuit diagram of a display panel provided by some embodiments of the present disclosure.

FIG. 6 is another circuit diagram of a display panel provided by some embodiments of the present disclosure. In other embodiments, as shown in FIG. 6, the first transistor T2 is connected between a first power supply terminal (not labeled in FIG. 6) and a first terminal of the driving transistor T1, the first power supply terminal is configured to provide a first power supply voltage V1. A second terminal of the driving transistor T1 is coupled to the light-emitting element 10 through the second control transistor T7. A gate of the second control transistor T7 is configured to receive a second control signal Em2. During the light-emitting phase, when the first transistor T2, the driving transistor T1, and the second control transistor T7 are turned on, the pixel circuit 20 provides a voltage to the first electrode of the light-emitting element 10 and the light-emitting element 10 emits light. In the embodiments, in the operating phase of the pixel circuit 20, the turn-on duration of the second control transistor T7 is greater than or equal to the turn-on duration of the first transistor T2. In other words, in the operating phase of the pixel circuit 20, the pulse width of the effective level of the second control signal Em2 is greater than or equal to the pulse width of the effective level provided by the comparison module 30. In some embodiments, an initial turn-on moment of the second control transistor T7 is earlier than an initial turn-on moment of the first transistor T2 in the operating phase of the pixel circuit 20.

In some embodiments of the present disclosure, the first transistor T2 is connected between the driving transistor T1 and the light-emitting element 10. In other embodiments, the first transistor T2 is connected between the driving transistor T1 and the first power terminal. The drawings of the following related embodiments only illustrate that the first transistor T2 is connected between the driving transistor T1 and the light-emitting element 10.

Figure 7:
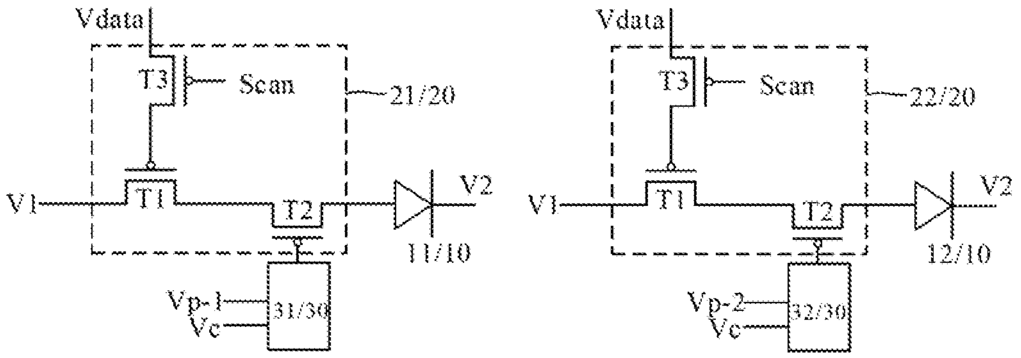
FIG. 7 is another circuit diagram of a display panel provided by some embodiments of the present disclosure.

FIG. 7 is another schematic diagram of a display panel circuit provided by some embodiments of the present disclosure. In some embodiments, as shown in FIG. 7, the light-emitting elements 10 include a first light-emitting element 11 and a second light-emitting element 12 of different colors. The pixel circuits 20 include a first pixel circuit 21 coupled to the first light-emitting element 11 and a second pixel circuit 22 coupled to the second light-emitting element 12. The comparison modules 30 include a first comparison module 31 and a second comparison module 32. The first comparison module 31 is coupled to the first transistor T2 of the first pixel circuit 21, and the second comparison module 32 is coupled to the first transistor T2 of the second pixel circuit 22.

The first comparison module 31 receives a first comparison signal Vp-1, and the second comparison module 32 receives a second comparison signal Vp-2. The first comparison signal Vp-1 and the second comparison signal Vp-2 have different voltage values. The first comparison module 31 and the second comparison module 32 receive a same reference signal Vc. Such configuration can realize that the first light-emitting element 11 and the second light-emitting element 12 have different light-emitting durations, thereby meeting the different requirements for the light-emitting durations of light-emitting elements 10 of different colors. The first comparison module 31 and the second comparison module 32 receive a same reference signal Vc, which can simplify the signal supply method of the display driver chip, reduce the number of pins of the display driver chip, save costs, and further simplify the wiring in the display panel.

Figure 8:
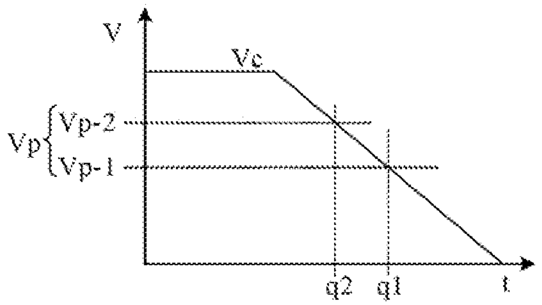
FIG. 8 is a schematic diagram of a reference signal provided by some embodiments of the present disclosure.

FIG. 8 is a schematic diagram of a reference signal provided by some embodiments of the present disclosure. The abscissa represents time t, and the ordinate represents voltage V. FIG. 8 illustrates that the reference signal Vc is a constant voltage during an initial period of the light-emitting phase, and then the voltage of the reference signal gradually decreases over time. Taking that the first transistor T2 can be controlled to turn on when Vp-Vc is smaller than the threshold, an early stage of the light-emitting stage is the light-emitting period, and the later stage is the non-light-emitting period. It can be seen from FIG. 8 that the voltage value of the first comparison signal Vp-1 is smaller than the voltage value of the second comparison signal Vp-2, a moment when Vp-1=Vc is q1, a moment when Vp-2=Vc is q2, and q2 is earlier than q1. That is, when other conditions are the same, the second comparison module 32 using the second comparison signal Vp-2 will control the first transistor T2 to turn off relatively earlier, so the light-emitting duration of the first light-emitting element 11 will be greater than the light-emitting duration of the second light-emitting element 12.

In the display panel provided by the embodiments of the present disclosure, the first comparison module 31 and the second comparison module 32 are configured to receive the comparison signals Vp with different voltage values, respectively, and further configured to receive the reference signals Vc with a same voltage, so that the first light-emitting element 11 and the second light-emitting element 12 have different light-emitting durations to meet the different requirements of the light-emitting elements 10 of different colors for the light-emitting duration. For example, the first light-emitting element 11 and the second light-emitting element 12 have different light-emitting efficiencies, and the difference in light-emitting efficiency between the two can be compensated by adjusting the light-emitting duration. For another example, the light-emitting efficiency of the first light-emitting element 11 and the light-emitting efficiency of the second light-emitting element 12 each decrease as the temperature increases, but the first light-emitting element 11 and the second light-emitting element 12 have different degrees of decrease in the light-emitting efficiency. By setting the voltage value of the first comparison signal Vp-1 and the voltage value of the second comparison signal Vp-2, the light-emitting duration of the first light-emitting element 11 and the light-emitting duration of the second light-emitting element 12 can be adjusted, respectively, so that the light-emitting durations of the first light-emitting element 11 and the second light-emitting element 12 compensate their brightness, respectively, to improve the display color cast caused by reduced light-emitting efficiency.

FIG. 8 illustrates a waveform of the reference signal Vc, which is equivalent to that the reference signal Vc includes a platform signal and a ramp signal. The platform signal is a constant voltage signal, and a voltage value of the ramp signal gradually decreases over time.

Figure 9:
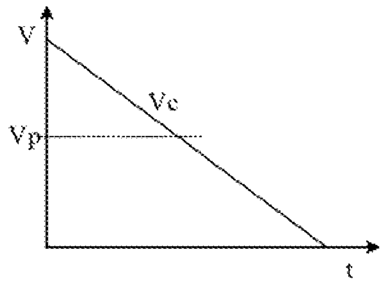
FIG. 9 is another schematic diagram of a reference signal provided by some embodiments of the present disclosure.

FIG. 9 is another schematic diagram of a reference signal provided by some embodiments of the present disclosure. In some implementations, as shown in FIG. 9, the voltage value of the reference signal Vc gradually decreases over time. Taking that an effective level signal can be output to control the first transistor T2 to turn on when Vp-Vc is smaller than the threshold, as an example, when adopting the reference signal Vc provided in the embodiments of FIG. 9, an early stage of the light-emitting stage is the light-emitting period, and a later stage is the non-light-emitting period. The smaller the comparison signal Vp, the longer the light-emitting duration.

Figure 10:
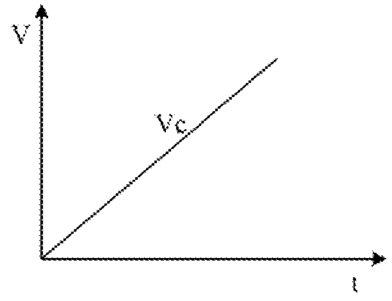
FIG. 10 is another schematic diagram of a reference signal provided by some embodiments of the present disclosure.

FIG. 10 is another schematic diagram of a reference signal provided by some embodiments of the present disclosure. In other embodiments, as shown in FIG. 10, the voltage value of the reference signal Vc gradually increases over time. Taking that an effective level signal can be output to control the first transistor T2 to turn on when Vp-Vc is smaller than the threshold, as an example, when adopting the reference signal Vc provided in the embodiments of FIG. 10, an early stage of the light-emitting stage is a non-light-emitting period, and a later stage is a light-emitting period. The smaller the comparison signal Vp, the shorter the non-light-emitting period and the longer the corresponding light-emitting duration.

Figure 11:
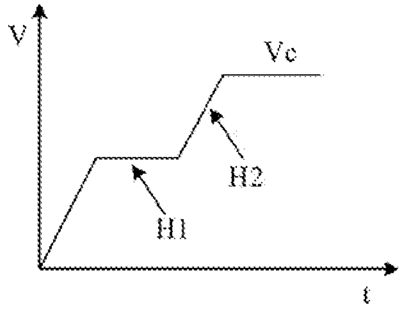
FIG. 11 is another schematic diagram of a reference signal provided by some embodiments of the present disclosure.

FIG. 11 is another schematic diagram of a reference signal provided by some embodiments of the present disclosure. In some embodiments, as shown in FIG. 11, the reference signal Vc includes at least one platform signal H1 and at least one ramp signal H2. The platform signal H1 is a constant voltage signal, the voltage value of the ramp signal H2 gradually increases over time. Taking an effective level signal can be output to control the first transistor T2 to turn on when Vp-Vc is smaller than the threshold, as an example, when adopting the reference signal Vc provided in the embodiment of FIG. 11, an early stage of the light-emitting stage is the light-emitting period, and a later stage is the non-light-emitting period. The smaller the comparison signal Vp, the longer the light-emitting duration.

In some embodiments, the reference signal Vc includes at least one platform signal H1 and at least one ramp signal H2, the platform signal H1 is a constant voltage signal, and the voltage value of the ramp signal H2 gradually decreases over time, which are not shown in the figures.

Figure 12:
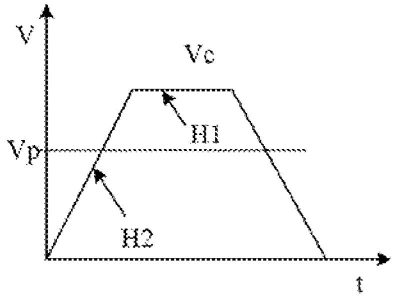
FIG. 12 is another schematic diagram of a reference signal provided by some embodiments of the present disclosure.

FIG. 12 is another schematic diagram of a reference signal provided by some embodiments of the present disclosure. In some embodiments, as shown in FIG. 12, the reference signal Vc includes at least one platform signal H1 and at least two ramp signals H2, the platform signal H1 is a constant voltage signal, a voltage value of the at least one ramp signal H2 gradually decreases over time, and a voltage value of at least another one ramp signal H2 gradually increases over time. FIG. 12 illustrates that a voltage value of a first ramp signal H2 gradually increases over time, and a voltage value of a second ramp signal H2 gradually decreases over time. Taking that an effective level signal can be output to control the first transistor T2 to turn on when Vp-Vc is smaller than the threshold, as an example, when adopting the reference signal Vc provided in the embodiment of FIG. 12, an early stage of the light-emitting stage is the non-light-emitting period, a middle stage is the light-emitting period, and a later stage is the non-light-emitting period. The smaller the comparison signal Vp, the shorter the non-light-emitting period, and the longer the corresponding light-emitting duration.

Figure 13:
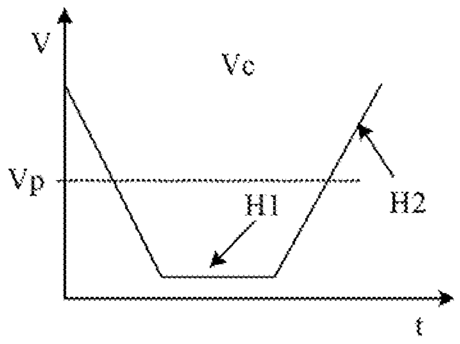
FIG. 13 is another schematic diagram of a reference signal provided by some embodiments of the present disclosure.

FIG. 13 is another schematic diagram of a reference signal provided by some embodiments of the present disclosure. In other embodiments, as shown in FIG. 13, the reference signal Vc includes a platform signal H1 and two ramp signals H2. The platform signal H1 is a constant voltage signal, a voltage value of a first ramp signal H2 gradually decreases over time, and a voltage value of a second ramp signal H2 gradually increases over time. Taking that an effective level signal can be output to control the first transistor T2 to turn on when Vp-Vc is smaller than the threshold, as an example, when adopting the reference signal Vc provided by the embodiments of FIG. 13, an early stage of the light-emitting stage is the light-emitting period, a middle stage is the non-light-emitting period, and a later stage is the light-emitting period. The smaller the comparison signal Vp, the longer the light-emitting period, and the longer the light-emitting duration.

Figure 14:
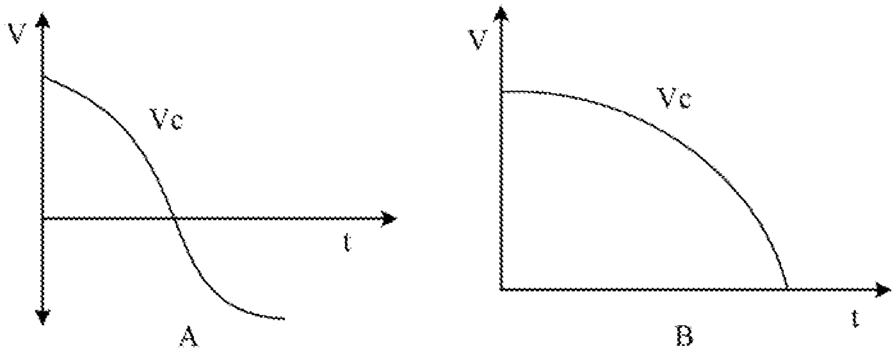
FIG. 14 is another schematic diagram of a reference signal provided by some embodiments of the present disclosure.

FIG. 9 to FIG. 13 illustrate several waveforms of the reference signal Vc during the light-emitting phase t1. FIG. 9 and FIG. 10 illustrate that the voltage of the reference signal Vc changes linearly over time. In other embodiments, the voltage of the reference signal Vc changes non-linearly over time. FIG. 14 is another schematic diagram of a reference signal provided by some embodiments of the present disclosure. As shown in A and B in FIG. 14, the voltage of the reference signal Vc changes non-linearly over time.

In some embodiments, as shown in FIG. 7, a light-emitting wavelength of the first light-emitting element 11 is greater than a light-emitting wavelength of the second light-emitting element 12, the first comparison module 31 and the second comparison module 32 receive a same reference signal Vc, and the voltage value of the comparison signal Vp-1 is smaller than the voltage value of the second comparison signal Vp-2. For example, both the first comparison module 31 and the second comparison module 32 include p-type comparison transistors. Combined with the timing sequence shown in FIG. 8, when the change rule of the reference signal Vc over time is determined, the smaller the voltage value of the comparison signal Vp, the longer the light-emitting period in the light-emitting stage, and the longer the light-emitting duration of the light-emitting element. The embodiments of the present disclosure can realize that the light-emitting duration of the first light-emitting element 11 is greater than the light-emitting duration of the second light-emitting element 12, so that the difference in light-emitting efficiency between the two can be compensated by adjusting the light-emitting duration.

In some application cases, the first light-emitting element 11 is configured to emit red light, and the second light-emitting element 12 is configured to emit green light or blue light. For example, the first light-emitting element 11 is a red light-emitting element and the second light-emitting element 12 is a green light-emitting element. The voltage value of the first comparison signal Vp-1 is set to be smaller than the voltage value of the second comparison signal Vp-2, so that the light-emitting duration of the red light-emitting element is greater than the light-emitting duration of the green light-emitting element, which can compensate the difference in light-emitting efficiency between the two by increasing the light-emitting duration of the red light-emitting element, and can meet the different needs of different color light-emitting elements for light-emitting duration.

Figure 15:
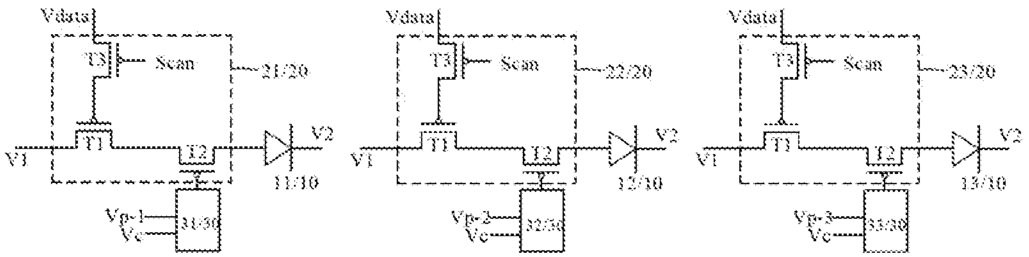
FIG. 15 is another circuit diagram of a display panel provided by some embodiments of the present disclosure.

FIG. 15 is another circuit diagram of a display panel provided by some embodiments of the present disclosure. In some embodiments, as shown in FIG. 15, the light-emitting elements 10 include a first light-emitting element 11, a second light-emitting element 12, and a third light-emitting element 13 of different colors. A light-emitting wavelength of the first light-emitting element 11 is greater than a light-emitting wavelength of the second light-emitting element 12, and a light-emitting wavelength of the third light-emitting element 13 is smaller than a light-emitting wavelength of the second light-emitting element 12. The third light-emitting element 13 is coupled to the third pixel circuit 23, and the third comparison module 33 is coupled to the first transistor T2 of the third pixel circuit 23. The three comparison modules 30 receive a same reference signal Vc. The first comparison module 31 receives the first comparison signal Vp-1, the second comparison module 32 receives the second comparison signal Vp-2, and the third comparison module 33 receives the third comparison signal Vp-3. The voltage value of the first comparison signal Vp-1 is smaller than the voltage value of the second comparison signal Vp-2, and the voltage value of the third comparison signal Vp-3 is greater than the voltage value of the second comparison signal Vp-2. Combined with the timing sequence shown in FIG. 8, with the design of the embodiments of the present disclosure, the light-emitting duration of the first light-emitting element 11 is greater than the light-emitting duration of the second light-emitting element 12, and the light-emitting duration of the second light-emitting element 12 is greater than the light-emitting duration of the third light-emitting element 13. According to the difference in light-emitting efficiencies of the light-emitting elements of three colors, the light-emitting durations of the light-emitting elements of three colors can be set individually.

In some embodiments, the first light-emitting element 11 is a red light-emitting element, the second light-emitting element 12 is a green light-emitting element, and the third light-emitting element 13 is a blue light-emitting element.

In other embodiments, the comparison transistor T4 is an n-type transistor, the light-emitting wavelength of the first light-emitting element 11 is greater than the light-emitting wavelength of the second light-emitting element 12, and the light-emitting wavelength of the third light-emitting element 13 is shorter than the light-emitting wavelength of the second light-emitting element 12. The voltage value of the first comparison signal Vp-1 is greater than the voltage value of the second comparison signal Vp-2, and the voltage value of the third comparison signal Vp-3 is smaller than the voltage value of the second comparison signal Vp-2.

Figure 16:
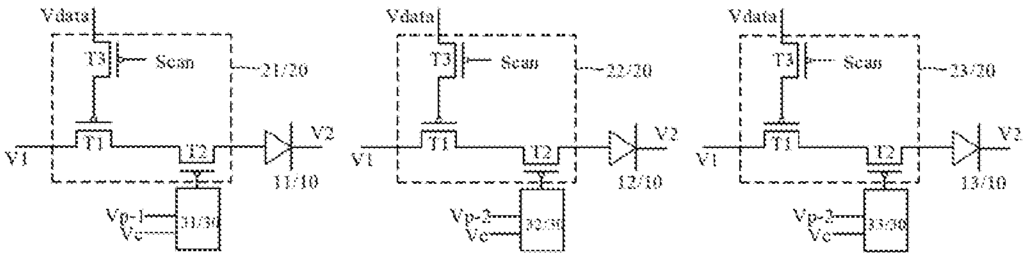
FIG. 16 is another circuit diagram of a display panel provided by some embodiments of the present disclosure.

FIG. 16 is another circuit diagram of a display panel provided by some embodiments of the present disclosure. In some embodiments, as shown in FIG. 16, the light-emitting elements 10 include a first light-emitting element 11, a second light-emitting element 12, and a third light-emitting element 13 of different colors. The first light-emitting element 11 has a light-emitting wavelength greater than a light-emitting wavelength of the second light-emitting element 12, and the third light-emitting element 13 has a light-emitting wavelength shorter than a light-emitting wavelength of the second light-emitting element 12. The display panel is provided with a first comparison module 31, a second comparison module 32 and a third comparison module 33, and the three comparison modules 30 receive a same reference signal Vc. The first comparison module 31 receives the first comparison signal Vp-1, and the second comparison module 32 and the third comparison module 33 receive the second comparison signal Vp-2. When the difference in light-emitting efficiencies of the second light-emitting element 12 and the third light-emitting element 13 is relatively small, the second comparison module 32 and the third comparison module 33 can be set to reuse one comparison signal, so that the light-emitting duration of the second light-emitting element 12 equals to the light-emitting duration of the third light-emitting element 13, which can realize synchronous adjustment of the light-emitting duration of the second light-emitting element 12 and the light-emitting duration of the third light-emitting element 13, and can further reduce the number of wiring signal lines that provide comparison signals, and reduce the wiring space of the display panel.

In some embodiments, the operating mode of the display panel includes a first mode and a second mode, the light-emitting element 10 includes a first light-emitting element 11 coupled to the first pixel circuit 21, and the first comparison module 31 is coupled to the first transistor T2 of the first pixel circuit 21 is coupled. The first comparison module 31 receives the first comparison signal Vp-1, and the voltage value of the first comparison signal Vp-1 in the first mode is greater than its voltage value in the second mode. As the temperature increases, the light-emitting efficiency of the light-emitting element 10 will decrease, and the decrease in light-emitting efficiency will lead to a decrease in the brightness of the light-emitting element 10, thereby causing a display color cast. The embodiments of the present disclosure sets the values of the first comparison signals Vp-1 in the first mode and the second mode with different operating temperatures, so that the first light-emitting element 11 has different light-emitting durations in different operating modes to meet the brightness needs in different modes. It can be understood from the timing sequence of FIG. 8 and related descriptions that the embodiment of the present disclosure can realize that the light-emitting durations of the first light-emitting element 11 in the second mode is greater than the light-emitting duration of the first light-emitting element 11 in the first mode. In some embodiments, the operating temperature of the display panel in the first mode is lower than the operating temperature in the second mode, that is, the light-emitting duration of the first light-emitting element 11 is increased in the high-temperature mode, thereby improving the brightness of the first light-emitting element 11 in the high-temperature mode to compensate the decrease in brightness caused by the decrease in light-emitting efficiency, and improving the problem of display color cast in high temperature mode.

In some applications, the second mode can be an operating mode that the display panel switches after operating for a long time. When the operating temperature of the display panel increases after operating for a long time, the corresponding first mode can be a mode where the display panel operates for a short period of time. For example, a temperature monitoring module is provided in the display panel. When it is detected that the operating temperature of the display panel is higher than a set temperature threshold, the display panel is controlled to switch to the second mode.

In some embodiments, the second mode can be a high-temperature operating mode of the display panel, and the first mode is a low-temperature operating mode of the display panel. For example, when the ambient temperature is higher than the temperature threshold, the display panel switches to the second mode; and when the ambient temperature is lower than the temperature threshold, the display panel switches to the first mode.

In other embodiments, the brightness requirements for the display panel in the first mode and the second mode are different.

In some embodiments, the driving frequency of the display panel in the first mode is different from the driving frequency of the display panel in the second mode, so the refresh time of one frame of the display panel in the first mode is different from the refresh time of one frame of the display panel in the second mode, and correspondingly, scanning times allocated to the pixel rows vary. The design of the embodiments of the present disclosure can realize that the light-emitting element have different light-emitting durations in the two modes, so as to meet the requirements for the scanning times of pixel row in different modes.

In some embodiments, the light-emitting elements 10 include a first light-emitting element 11 and a second light-emitting element 12. As shown in FIG. 7, a first comparison module 31 is provided corresponding to the first light-emitting element 11, and a second comparison module 32 is provided corresponding to the second light-emitting element 12. The first comparison module 31 receives the first comparison module Vp-1, and the second comparison module 32 receives the second comparison signal Vp-2. The voltage value of the first comparison signal Vp-1 in the first mode is greater than its voltage value in the second mode, and the voltage value of the second comparison signal Vp-2 in the first mode is greater than its voltage value in the second mode. An absolute value Δ1 of a difference between the voltage values of the first comparison signal Vp-1 in the first mode and the second mode and an absolute value Δ2 of a difference between the voltage values of the second comparison signal Vp-2 in the first mode and the second mode satisfy Δ1>Δ2. Combining the timing sequence of FIG. 8 and related explanations, it can be learned that when the change rule of the reference signal Vc is determined, the smaller the voltage value of the comparison signal Vp and the longer the light-emitting duration. In this way, the greater the change degree in the voltage value of the comparison signal Vp, and the larger the increase degree of the light-emitting duration.

In the embodiments, the first light-emitting element 11 and the second light-emitting element 12 emit light of different colors, have different light-emitting efficiencies, and have different decrease degrees in light-emitting efficiency in the second mode. If Δ1>Δ2 is set, then compared with the first mode, the increase degree in the light-emitting duration of the first light-emitting element 11 in the second mode is greater than the increase degree in the light-emitting duration of the second light-emitting element 12 in the second mode. Therefore, by increasing the light-emitting duration, different degrees of brightness compensation can be performed on the first light-emitting element 11 and the second light-emitting element 12 in the second mode, and the brightness decreases of the first light-emitting element 11 and the second light-emitting element 12 caused by the decreases in their light-emitting efficiencies at high temperature can be compensated, respectively, thereby improving the problem of display color cast in high temperature mode.

In some other embodiments, the voltage value of the second comparison signal Vp-2 in the first mode is equal to the voltage value of the second comparison signal Vp-2 in the second mode. That is, when the difference in light-emitting efficiency of the second light-emitting element 12 in the first mode and the second mode is small, only one second comparison signal Vp-2 can be provided for the two modes. The second light-emitting element 12 has a same light-emitting duration in the first mode and the second mode, and the light-emitting duration of the first light-emitting element 11 in the second mode is greater than the light-emitting duration of the first light-emitting element 11 in the first mode. When switching between the first mode and the second mode, the value of the first comparison signal Vp-1 is switched without changing the signal value of the second comparison signal Vp-2, which can simplify the driving method of the display panel. In some embodiments, the first light-emitting element 11 is a red light-emitting element, and the second light-emitting element 12 is a green or blue light-emitting element.

Figure 17:
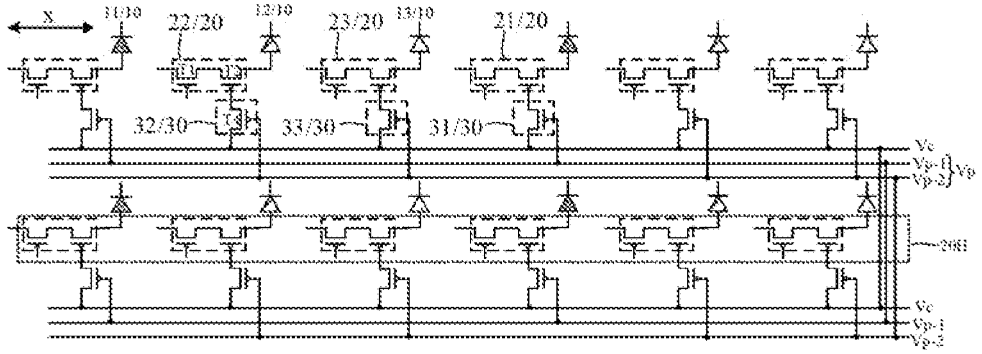
FIG. 17 is another schematic diagram of a display panel provided by some embodiments of the present disclosure.

FIG. 17 is another schematic diagram of a display panel provided by some embodiments of the present disclosure. In some embodiments, as shown in FIG. 17, the comparison modules 30 and the pixel circuits 20 are in one-to-one correspondence. The pixel circuit 20 includes at least a driving transistor T1 and a first transistor T2. In the embodiments, the comparison module 30 corresponds to the light-emitting elements 10 in one-to-one correspondence, that is, each light-emitting element 10 is provided with a comparison module 30 for adjusting the light-emitting duration, which can independently adjust the light-emitting durations of the light-emitting elements 10, so that the light-emitting elements 10 can emit light independently and irrelevantly.

In some embodiments, the comparison module 30 is disposed in the display region. The comparison module 30 includes a comparison transistor T4. The comparison transistor T4 and each transistor in the pixel circuit 20 are manufactured in a same process.

As shown in FIG. 17, the display panel includes a reference signal line Vc extending along the first direction x. The reference signal line Vc provides a reference signal Vc. In order to simplify the labeling method, the reference signal line and the reference signal in FIG. 17 use the same label. Multiple pixel circuits 20 are arranged into a pixel circuit row 20H along the first direction x, and multiple comparison modules 30 coupled to one pixel circuit row 20H share one reference signal line Vc. In the embodiments of the present disclosure, multiple comparison modules can share the reference signal Vc, which can not only reduce the wires in the display panel, but further reduce the number of pins of the display driver chip and be beneficial to reducing production costs.

As shown in FIG. 17, the display panel includes a comparison signal line Vp extending along the first direction, and the comparison signal line Vp is configured to provide a comparison signal Vp. To simplify labelling method, the comparison signal line and the comparison signal are marked with a same reference sign. For example, the first comparison signal line Vp-1 provides the first comparison signal Vp-1. The display panel is further provided with scanning lines (not shown in FIG. 17). The scanning lines drive the pixel circuit row 20H, and the scanning line extends along the first direction x. The pixel circuit rows 20H arranged along the first direction x include pixel circuits 20 coupled to the light-emitting elements 10 of a same color, and comparison modules 30 coupled to these pixel circuits 20 share a comparison signal line Vp. As shown in FIG. 17, the first pixel circuit 21 is coupled to the first light-emitting element 11, and the comparison modules 30 coupled to the first pixel circuits 21 in the pixel circuit row 20H are coupled to one first comparison signal line Vp-1. In the embodiments, one comparison signal line Vp simultaneously controls the light-emitting duration of multiple light-emitting elements 10 of a same color driven by one pixel circuit row, and the first transistors T2 driving the light-emitting elements 10 of a same color have a turn-on duration. In order to facilitate wiring, corresponding comparison signal lines Vp can be set row by row according to the pixel circuit rows 20H. The comparison signal line Vp can directly provide a signal from the display driver chip, that is, the display driver chip is provided with an output pin, and the comparison signal line Vp is electrically connected to the output pin. In other embodiments, a shift driving circuit can be provided on the display panel, and the comparison signal line Vp is electrically connected to the shift register in the shift driving circuit.

As shown in FIG. 17, the comparison signal lines Vp include a first comparison signal line Vp-1 and a second comparison signal line Vp-2. The first comparison signal line Vp-1 provides the first comparison signal Vp-1, and the second comparison signal line Vp-2 provides the second comparison signal Vp-2. The first light-emitting element 11 is coupled to the first pixel circuit 21, the second light-emitting element 12 is coupled to the second pixel circuit 22, and the third light-emitting element 13 is coupled to the third pixel circuit 23. The first comparison module 31 is coupled to the first transistor T2 of the first pixel circuit 21, the second comparison module 32 is coupled to the first transistor T2 of the second pixel circuit 22, and the third comparison module 33 is coupled to the first transistor T2 of the third pixel circuit 23. One pixel circuit row 20H includes multiple first pixel circuits 21, and multiple first comparison modules 31 coupled to these first pixel circuits 21 share one first comparison signal line Vp-1; one pixel circuit row 20H includes multiple second pixel circuits 22 and multiple third pixel circuits 23, multiple second comparison modules 32 coupled to these second pixel circuits 22 and multiple third comparison modules 33 coupled to these multiple third pixel circuits 23 share one second comparison signal line Vp-2. When the pixel circuit row 20H includes the first pixel circuit 21, the second pixel circuit 22, and the third pixel circuit 23, only two comparison signal lines Vp are provided for each pixel circuit row 20H, which can reduce the number of wires in the display panel and save wiring space.

In other embodiments, the comparison signal lines Vp includes a first comparison signal line, a second comparison signal line, and a third comparison signal line, and the first comparison signal line, the second comparison signal line, and the third comparison signal line respectively provide comparison signals with different voltage values. Multiple first comparison modules coupled to one pixel circuit row share a first comparison signal line, multiple second comparison modules coupled to one pixel circuit row share a second comparison signal line, and multiple third comparison modules coupled to one pixel circuit row share one third comparison signal line, which are not shown in figures.

Figure 18:
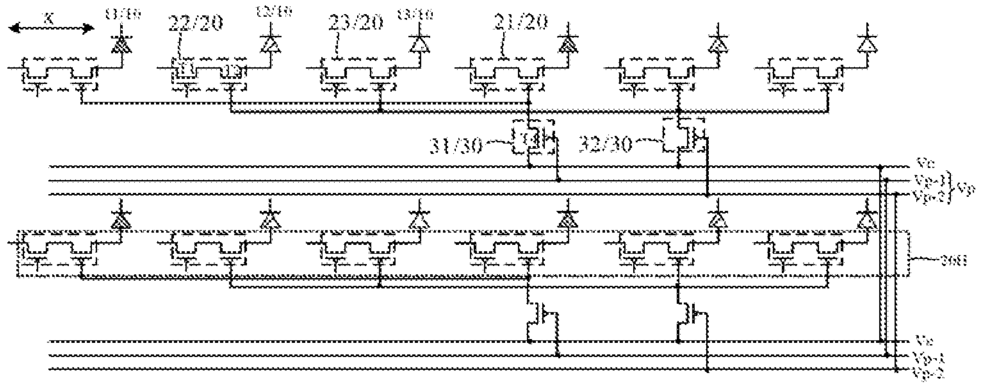
FIG. 18 is another schematic diagram of a display panel provided by some embodiments of the present disclosure.

FIG. 18 is another schematic diagram of a display panel provided by some embodiments of the present disclosure. In some embodiments, as shown in FIG. 18, multiple pixel circuits 20 are arranged along the first direction x to form one pixel circuit row 20H, the pixel circuit row 20H includes multiple pixel circuits 20 coupled to the light-emitting elements 10 of a same color, and the multiple pixel circuits 20 are coupled to a same comparison module 30. Such configuration can make the first transistors T2 connected to the light-emitting elements 10 of a same color have a same turn-on duration, and then the light-emitting elements 10 of a same color have a same light-emitting duration. With such configuration, the number of comparison modules 30 can be reduced and the wiring space of the display panel can be reduced.

As shown in FIG. 18, the light-emitting elements 10 include a first light-emitting element 11, a second light-emitting element 12, and a third light-emitting element 13 of different colors. The pixel circuits 20 include a first pixel circuit 21 coupled to the first light-emitting element 11, a second pixel circuit 22 coupled to the second light-emitting element 12, and a third pixel circuit 23 coupled to the third light-emitting element 13. Multiple first pixel circuits 21 in the pixel circuit row 20H are coupled to one first comparison module 31, and multiple second pixel circuits 22 and multiple third pixel circuits 23 in the pixel circuit row 20H are coupled to one second comparison module 32. When the pixel circuit row 20H includes the first pixel circuit 21, the second pixel circuit 22, and the third pixel circuit 23, only two comparison modules 30 are provided for each pixel circuit row 20H. Such configuration can reduce the number of comparison modules 30 and can further reduce the number of comparison signal lines, thereby reducing the wiring space of the display panel.

In some embodiments, the second pixel circuit 22 and the third pixel circuit 23 do not share the comparison module 30, that is, the second pixel circuit 22 is coupled to the second comparison module, the third pixel circuit 23 is coupled to the third comparison module, the second comparison module is coupled to the second comparison signal line, the third comparison module is coupled to the third comparison signal line, and the voltage values provided by the second comparison signal line and the third comparison signal line are different, which are not shown in figures.

Figure 19:
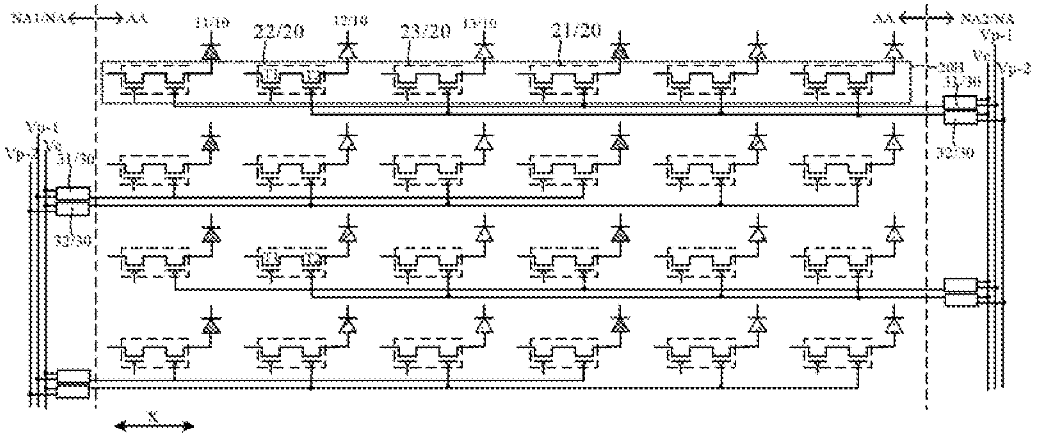
FIG. 19 is another schematic diagram of a display panel provided by some embodiments of the present disclosure.

FIG. 19 is another schematic diagram of a display panel provided by some embodiments of the present disclosure. In some embodiments, as shown in FIG. 19, the pixel circuit row 20H includes multiple pixel circuits 20 coupled to the light-emitting elements 10 of a same color, and multiple pixel circuits 20 are coupled to a same comparison module 30. The display panel includes a display region AA and a non-display region NA, and the comparison module 30 is located in the non-display region NA. In the embodiments, the comparison module 30 is provided in the non-display region NA, which does not affect the arrangement rule of the pixel circuits 20 in the display region AA and can ensure the uniformity of the transistor etching process. Two comparison modules 30 or three comparison modules 30 are provided corresponding to one pixel circuit row 20H. The number of comparison modules 30 is relatively small, and the configuration where these comparison modules 30 are provided in the non-display region NA will have a relatively small impact on the wiring space of the non-display region NA.

As shown in FIG. 19, the non-display region NA includes a first non-display region NA1 and a second non-display region NA2, the first non-display region NA1 and the second non-display region NA2 are respectively located at two sides of the display region AA in the first direction x, at least one comparison module 30 is located in the first non-display region NA1, and at least another one comparison module 30 is located in the second non-display region NA2. That is, the comparison modules 30 are dispersed in the non-display regions NA located at both sides of the display region AA, which can balance the difference in frame width of the non-display regions NA at both sides and improve the user's time experience.

Figure 20:
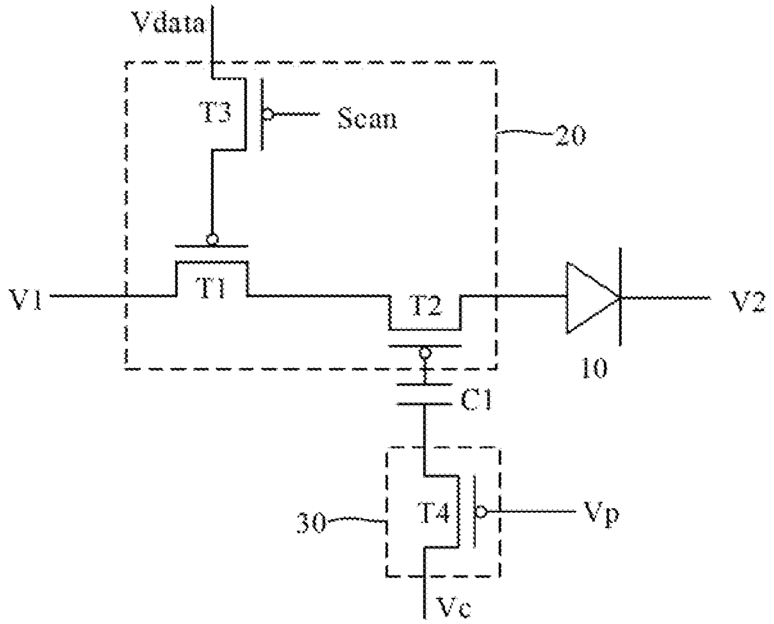
FIG. 20 is another circuit diagram of a display panel provided by some embodiments of the present disclosure.

FIG. 20 is another circuit diagram of a display panel provided by some embodiments of the present disclosure. In some embodiments, as shown in FIG. 20, the comparison module 30 is coupled to the gate of the first transistor T2 through the first capacitor C1. Such configuration controls the on/off state of the first transistor T2 through the voltage coupling effect of the first capacitor C1.

Figure 21:
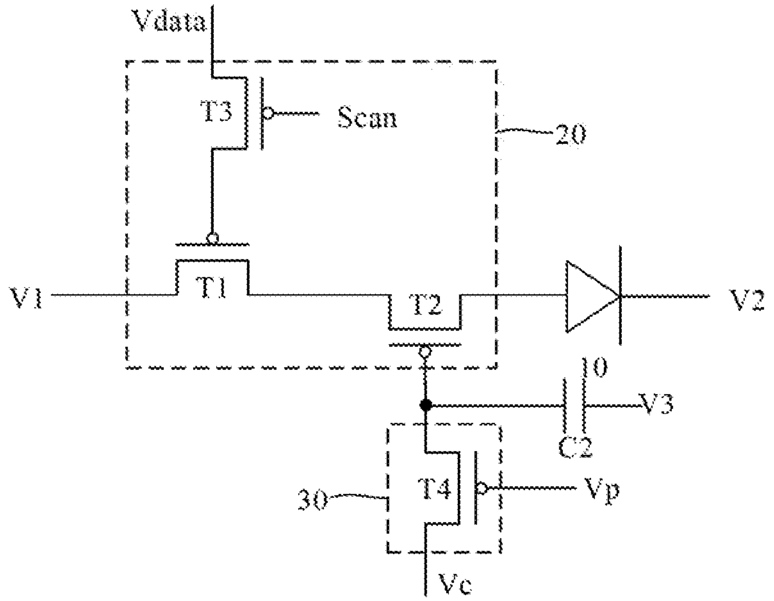
FIG. 21 is another circuit diagram of a display panel provided by some embodiments of the present disclosure.

FIG. 21 is another circuit diagram of a display panel provided by some embodiments of the present disclosure. In other embodiments, as shown in FIG. 21, an output terminal of the comparison module 30 and the gate of the first transistor T2 are both connected to one plate of the second capacitor C2, the other plate of the second capacitor C2 is connected to the third voltage signal V3, and the third voltage signal V3 is a constant voltage signal. In the embodiments, the second capacitor C2 is provided to stabilize the gate voltage of the first transistor T2.

Figure 22:
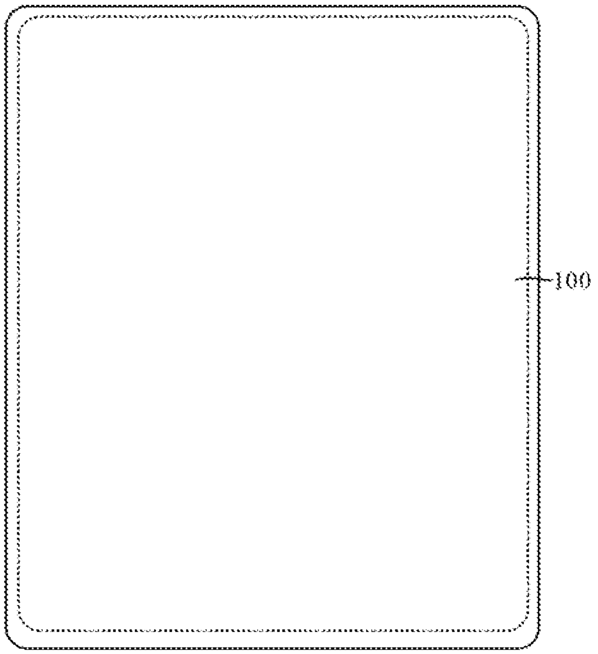
FIG. 22 is a schematic diagram of a display device provided by some embodiments of the present disclosure.

Some embodiments of the present disclosure further provides a display device. FIG. 22 is a schematic diagram of a display device provided by some embodiments of the present disclosure. As shown in FIG. 22, the display device includes the display panel 100 provided by any embodiment of the present disclosure. The structure of the display panel 100 has been described in the above embodiments and will not be repeated herein. The display device provided by the embodiments of the present disclosure may be, for example, a mobile phone, a tablet, a billboard, a vehicle display, or other electronic equipment.

The above are merely exemplary embodiments of the present disclosure, which, as mentioned above, are not used to limit the present disclosure. Whatever within the principles of the present disclosure, including any modification, equivalent substitution, improvement, etc., shall fall into the protection scope of the present disclosure.

Finally, it should be noted that the technical solutions of the present disclosure are illustrated by the above embodiments, but not intended to limit thereto. Although the present disclosure has been described in detail with reference to the foregoing embodiments, those skilled in the art can understand that the present disclosure is not limited to the specific embodiments described herein, and can make various modifications, readjustments, and substitutions without departing from the scope of the present disclosure.

What is claimed is:

1. A display panel, comprises:

at least one light-emitting element;

at least one pixel circuit coupled to the at least one light-emitting element, wherein one pixel circuit of the at least one pixel circuit comprises a driving transistor and a first transistor that are connected to each other in series; and at least one comparison module, wherein one of the at least one comparison module is coupled to a gate of the first transistor and is configured to compare a voltage value of a comparison signal and a voltage value of a reference signal to generate a control signal, and to provide the control signal to the gate of the first transistor, wherein an operating phase of one pixel circuit of the at least one pixel circuit comprises a light-emitting phase, wherein, during the light-emitting phase, the comparison signal is a constant voltage signal during the light-emitting phase, and a voltage of the reference signal changes over time during at least one period of the light-emitting phase; and wherein, during the light-emitting phase, the voltage value of the reference signal changes over time to satisfy at least one case of a first case, a second case, and a third case, wherein, in the first case, the voltage value of the reference signal gradually decreases or increases over time;

in the second case, the reference signal comprises at least one platform signal and at least one ramp signal, the at least one platform signal each is a constant voltage signal, and a voltage value of each of the at least one ramp signal gradually decreases or increases over time; and in the third case, the reference signal comprises at least one platform signal and at least two ramp signals, each of the at least one platform signal is a constant voltage signal, a voltage value of at least one ramp signal gradually decreases over time, and a voltage value of at least another one ramp signal increases over time.

2. The display panel according to claim 1, wherein the at least one light-emitting element comprises a first light-emitting element and a second light-emitting element that have different colors, and the at least one pixel circuit comprises a first pixel circuit coupled to the first light-emitting element and a second pixel circuit coupled to the second light-emitting element;

wherein the at least one comparison module comprises a first comparison module and a second comparison module, wherein the first comparison module is coupled to the first transistor of the first pixel circuit, and the second comparison module is coupled to the first transistor of the second pixel circuit; and wherein the comparison signal comprises a first comparison signal and a second comparison signal with different voltage values, wherein the first comparison module and the second comparison module are configured to receive the first comparison signal and the second comparison signal, respectively, and the first comparison module and the second comparison module are configured to receive the reference signal.

3. The display panel according to claim 2, wherein a light-emitting wavelength of the first light-emitting element is greater than a light-emitting wavelength of the second light-emitting element, and the voltage value of the first comparison signal is smaller than the voltage value of the second comparison signal.

4. The display panel according to claim 3, wherein the at least one light-emitting element further comprises a third light-emitting element, wherein a light-emitting wavelength of the third light-emitting element is greater than the light-emitting wavelength of the second light-emitting element, and the at least one pixel circuit further comprises a third pixel circuit coupled to the third light-emitting element;

wherein the at least one comparison module comprises a third comparison module coupled to the first transistor of the third pixel circuit, wherein the third comparison module and the first comparison module receive the reference signal; and wherein the comparison signal further comprises a third comparison signal received by the third comparison module, wherein a voltage value of the third comparison signal is greater than the voltage value of the second comparison signal.

5. The display panel according to claim 3, wherein:

the first light-emitting element is configured to emit red light; and the second light-emitting element is configured to emit green light or blue light.

6. The display panel according to claim 2, wherein the at least one light-emitting element further comprises a third light-emitting element, wherein a light-emitting wavelength of the third light-emitting element is greater than a light-emitting wavelength of the second light-emitting element, and the at least one pixel circuit further comprises a third pixel circuit coupled to the third light-emitting element;

wherein the at least one comparison module comprises a third comparison module coupled to the first transistor of the third pixel circuit, wherein the third comparison module and the first comparison module receive the reference signal; and wherein the third comparison module is configured to receive the second comparison signal.

7. The display panel according to claim 1, having an operating mode comprising a first mode and a second mode, wherein the at least one light-emitting element comprises a first light-emitting element, and the at least one pixel circuit comprises a first pixel circuit coupled to the first light-emitting element;

the at least one comparison module comprises a first comparison module coupled to the first transistor of the first pixel circuit; and wherein the comparison signal comprises a first comparison signal, wherein the first comparison module is configured to receive the first comparison signal, and a voltage value of the first comparison signal in the first mode is greater than a voltage value of the first comparison signal in the second mode.

8. The display panel according to claim 7, wherein the at least one light-emitting element further comprises a second light-emitting element, and the at least one pixel circuit further comprises a second pixel circuit coupled to the second light-emitting element; the at least one comparison module further comprises a second comparison module coupled to the first transistor of the second pixel circuit;

wherein the comparison signal comprises a second comparison signal, wherein the second comparison module is configured to receive the second comparison signal, and a voltage value of the second comparison signal in the first mode is greater than or equal to a voltage value of the second comparison signal in the second mode; and wherein an absolute value Δ1 of a difference between a voltage value of the first comparison signal in the first mode and a voltage value of the first comparison signal in the second mode and an absolute value Δ2 of a difference between the voltage value of the second comparison signal in the first mode and the voltage value of the second comparison signal in the second mode satisfy: $\Delta1>\Delta2$.

9. The display panel according to claim 1, wherein the at least one comparison module is in one-to-one correspondence with the pixel circuit.

10. The display panel according to claim 9, further comprising:

at least one reference signal line each extending along a first direction and configured to provide the reference signal, wherein the at least one pixel circuit comprises a plurality of pixel circuits, the at least one comparison module comprises a plurality of comparison modules, at least two pixel circuits of the plurality of pixel circuits are arranged in the first direction to form one pixel circuit row of at least one pixel circuit row, and at least two comparison modules of the plurality of comparison modules that are coupled to one pixel circuit row of the at least one pixel circuit row share one of the at least one reference signal line.

11. The display panel according to claim 10, further comprising:

at least one comparison signal line each extending along the first direction and configured to provide the comparison signal, wherein the pixel circuit row comprises at least two of the plurality of pixel circuits that are coupled to the light-emitting elements of a same color, and at least two of the plurality of comparison modules coupled to the at least two pixel circuits share one of the at least one comparison signal line.

12. The display panel according to claim 11, wherein the at least one comparison signal line comprises at least one first comparison signal line and at least one second comparison signal line;

wherein the at least one light-emitting element comprises first light-emitting elements, second light-emitting elements and third light-emitting elements that have different colors, and the at least one pixel circuit comprises first pixel circuits coupled to the first light-emitting elements, second pixel circuits coupled to the second light-emitting elements, and third pixel circuits coupled to the third light-emitting elements;

wherein the at least one comparison module comprises first comparison modules, second comparison modules, and third comparison modules, wherein the first comparison module is coupled to the first transistor of the first pixel circuit, the second comparison module is coupled to the first transistor of the second pixel circuit, and the third comparison module is coupled to the first transistor of the third pixel circuit;

wherein one pixel circuit row comprises at least two first pixel circuits, and at least two first comparison modules coupled to the at least two first pixel circuits share one of the at least one first comparison signal line; and wherein one pixel circuit row comprises at least two second pixel circuits and at least two third pixel circuits, at least two second comparison modules coupled to the at least two second pixel circuits and at least two third comparison modules coupled to the third pixel circuits share one of the at least one second comparison signal line.

13. The display panel according to claim 1, wherein the at least one pixel comprises a plurality of the pixel circuits, at least two pixel circuits of the plurality of the pixel circuits are arranged along a first direction to form one pixel circuit row of at least one pixel circuit row; and wherein the pixel circuit row comprises at least two pixel circuits of the plurality of pixel circuits coupled to the light-emitting elements of a same color, and the at least two pixel circuits are coupled to one of the at least one comparison module.

14. The display panel according to claim 13, wherein the at least one light-emitting element comprises first light-emitting elements, second light-emitting elements and third light-emitting elements that have different colors, wherein the at least one pixel circuit comprises first pixel circuits coupled to the first light-emitting elements, second pixel circuits coupled to the second light-emitting elements, and third pixel circuits coupled to the third light-emitting elements;

wherein the at least one comparison module comprises at least one first comparison module and at least one second comparison module; and wherein at least two first pixel circuits in the pixel circuit row are coupled to one of the at least one first comparison module, and at least two second pixel circuits and at least two third pixel circuits in the pixel circuit row are coupled to one of the at least one second comparison module.

15. The display panel according to claim 13, further comprising a display region and a non-display region, wherein the at least one comparison module is located in the non-display region.

16. The display panel according to claim 1, wherein the first transistor is connected between the driving transistor and one of the at least one light-emitting element; or, wherein the first transistor is connected between a first power supply terminal and a first terminal of the driving transistor, and a second terminal of the third driving transistor are coupled to the light-emitting element.

17. The display panel according to claim 1, wherein one comparison module of the at least one comparison module comprises a comparison transistor, wherein either a gate and a source of the comparison transistor is configured to receive the comparison signal, and either of the gate and the source of the comparison transistor is configured to receive the reference signal.

18. The display panel according to claim 17, wherein the comparison transistor is a p-type transistor, wherein the comparison transistor comprises a gate configured to receive the comparison signal, and a source configured to receive the reference signal.

19. A display device, comprising a display panel, wherein the display panel comprises:

at least one light-emitting element;

at least one pixel circuit coupled to the at least one light-emitting element, wherein one pixel circuit of the at least one pixel circuit comprises a driving transistor and a first transistor that are connected to each other in series; and at least one comparison module, wherein one of the at least one comparison module is coupled to a gate of the first transistor and is configured to compare a voltage value of a comparison signal and a voltage value of a reference signal to generate a control signal, and to provide the control signal to the gate of the first transistor, wherein an operating phase of one pixel circuit of the at least one pixel circuit comprises a light-emitting phase, wherein, during the light-emitting phase, the comparison signal is a constant voltage signal during the light-emitting phase, and a voltage of the reference signal changes over time during at least one period of the light-emitting phase; and wherein, during the light-emitting phase, the voltage value of the reference signal changes over time to satisfy at least one case of a first case, a second case, and a third case, wherein, in the first case, the voltage value of the reference signal gradually decreases or increases over time;

in the second case, the reference signal comprises at least one platform signal and at least one ramp signal, the at least one platform signal each is a constant voltage signal, and a voltage value of each of the at least one ramp signal gradually decreases or increases over time; and in the third case, the reference signal comprises at least one platform signal and at least two ramp signals, each of the at least one platform signal is a constant voltage signal, a voltage value of at least one ramp signal gradually decreases over time, and a voltage value of at least another one ramp signal increases over time.

* * * * *